(12) United States Patent
Alvarez

(10) Patent No.: US 9,632,741 B1
(45) Date of Patent: Apr. 25, 2017

(54) WIRELESS ELECTRONIC RETAIL PRICE TAG SYSTEM

(71) Applicant: Gerardo Alvarez, North Hollywood, CA (US)

(72) Inventor: Gerardo Alvarez, North Hollywood, CA (US)

( * ) Notice: Subject to any disclaimer, the term of this patent is extended or adjusted under 35 U.S.C. 154(b) by 0 days.

(21) Appl. No.: 14/672,964

(22) Filed: Mar. 30, 2015

(51) Int. Cl.
| | |
|---|---|
| *G06Q 20/20* | (2012.01) |
| *G06F 3/14* | (2006.01) |
| *H02J 7/00* | (2006.01) |
| *G09G 3/36* | (2006.01) |
| *G09G 5/00* | (2006.01) |
| *G06F 3/147* | (2006.01) |

(52) U.S. Cl.
CPC ............ *G06F 3/1454* (2013.01); *G06F 3/147* (2013.01); *G06Q 20/201* (2013.01); *G09G 3/36* (2013.01); *G09G 5/005* (2013.01); *G09G 5/006* (2013.01); *H02J 7/0052* (2013.01); *G09G 2330/02* (2013.01); *G09G 2370/16* (2013.01); *G09G 2380/04* (2013.01)

(58) Field of Classification Search
None
See application file for complete search history.

(56) References Cited

U.S. PATENT DOCUMENTS

| | | | | |
|---|---|---|---|---|
| 3,757,511 A | * | 9/1973 | Burgess | G04C 10/02 257/E27.128 |
| 5,111,196 A | | 5/1992 | Hunt | |
| 5,465,085 A | * | 11/1995 | Caldwell | G06F 3/147 235/383 |
| 5,797,132 A | * | 8/1998 | Altwasser | G06F 3/147 705/16 |
| 6,552,663 B2 | | 4/2003 | Swartzel | |
| 6,570,492 B1 | | 5/2003 | Peratoner | |
| 6,791,466 B1 | | 9/2004 | Chang | |
| 7,287,001 B1 | * | 10/2007 | Falls | G06Q 10/087 235/383 |
| D574,438 S | | 8/2008 | Mori | |
| 7,918,395 B2 | | 4/2011 | Gelbman | |
| 8,009,348 B2 | | 8/2011 | Zehner | |
| 8,313,025 B2 | | 11/2012 | Saxena | |
| 2005/0152108 A1 | * | 7/2005 | Goel | G06Q 10/087 361/679.01 |
| 2006/0080877 A1 | * | 4/2006 | Lowry | G09F 3/204 40/642.02 |
| 2014/0129935 A1 | * | 5/2014 | Ovadia Nahon | G06F 3/01 715/716 |
| 2014/0353368 A1 | * | 12/2014 | Connolly | G06F 3/147 235/375 |
| 2015/0110153 A1 | * | 4/2015 | Hoblit | G06Q 10/087 374/141 |

FOREIGN PATENT DOCUMENTS

WO          WO0067110 A1     11/2000

* cited by examiner

*Primary Examiner* — Joni Richer

(57) ABSTRACT

The wireless electronic retail price tag system is a display system for retail shelves. The wireless electronic retail price tag system is a wireless electronic display that attaches readily on shelves and that is used for displaying product, price, and marketing information items on the shelves. The wireless electronic retail price tag system is adapted to communicate with and to be updated by a master computer located in a secure location. The wireless electronic retail price tag system comprises an LCD, a microcontroller, a remote wireless interface, and a housing.

1 Claim, 3 Drawing Sheets

WIRELESS ELECTRONIC RETAIL PRICE TAG SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electronic displays, more specifically, a display device for use in retail environments.

SUMMARY OF INVENTION

The wireless electronic retail price tag system is a display system for retail shelves. The wireless electronic retail price tag system is a wireless electronic display that attaches readily on shelves and that is used for displaying product, price, and marketing information items on the shelves. The wireless electronic retail price tag system is adapted to communicate with and to be updated by a master computer located in a secure location.

These together with additional objects, features and advantages of the wireless electronic retail price tag system will be readily apparent to those of ordinary skill in the art upon reading the following detailed description of the presently preferred, but nonetheless illustrative, embodiments when taken in conjunction with the accompanying drawings.

In this respect, before explaining the current embodiments of the wireless electronic retail price tag system in detail, it is to be understood that the wireless electronic retail price tag system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the wireless electronic retail price tag system.

It is therefore important that the claims be regarded as including such equivalent construction insofar as they do not depart from the spirit and scope of the wireless electronic retail price tag system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
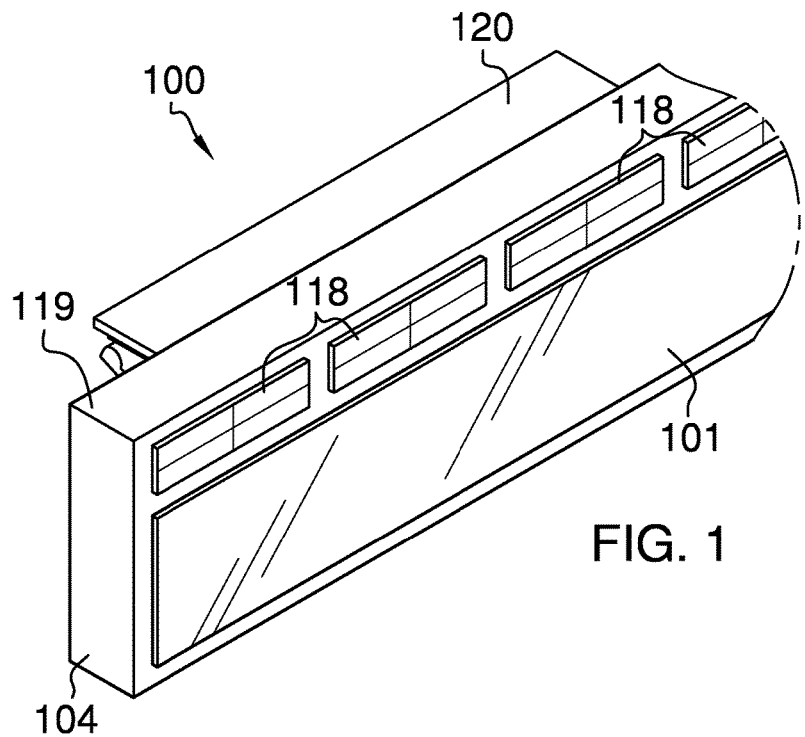
FIG. 1 is a perspective view of an embodiment of the disclosure.
Figure 2:
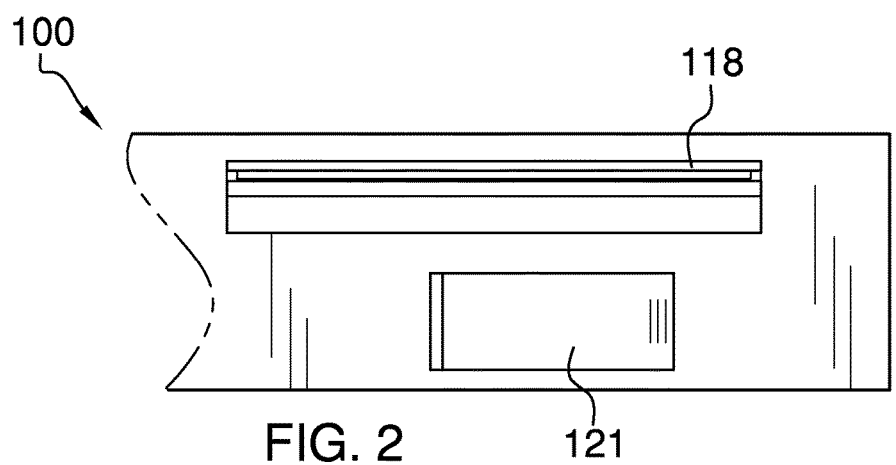
FIG. 2 is a rear view of an embodiment of the disclosure.
Figure 3:
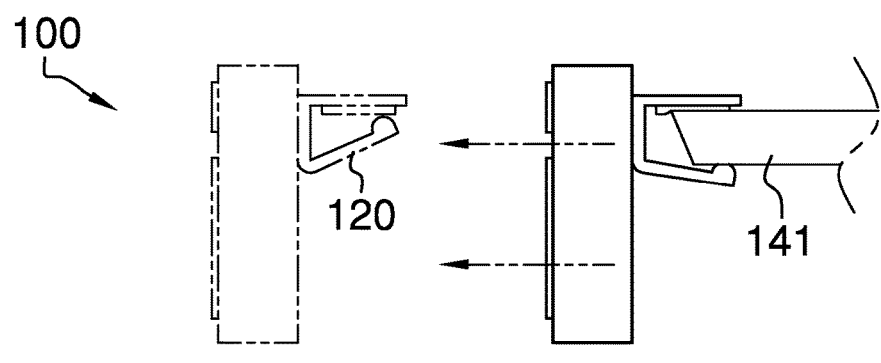
FIG. 3 is a side view of an embodiment of the disclosure.
Figure 4:
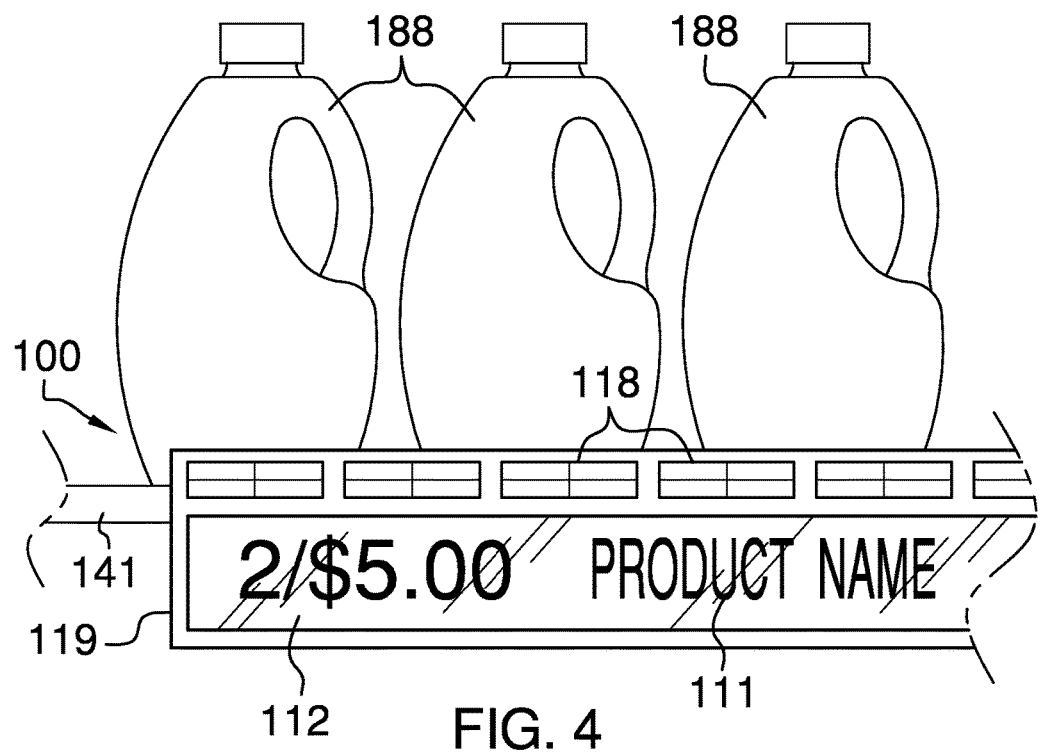
FIG. 4 is a front view of an embodiment of the disclosure.
Figure 5:
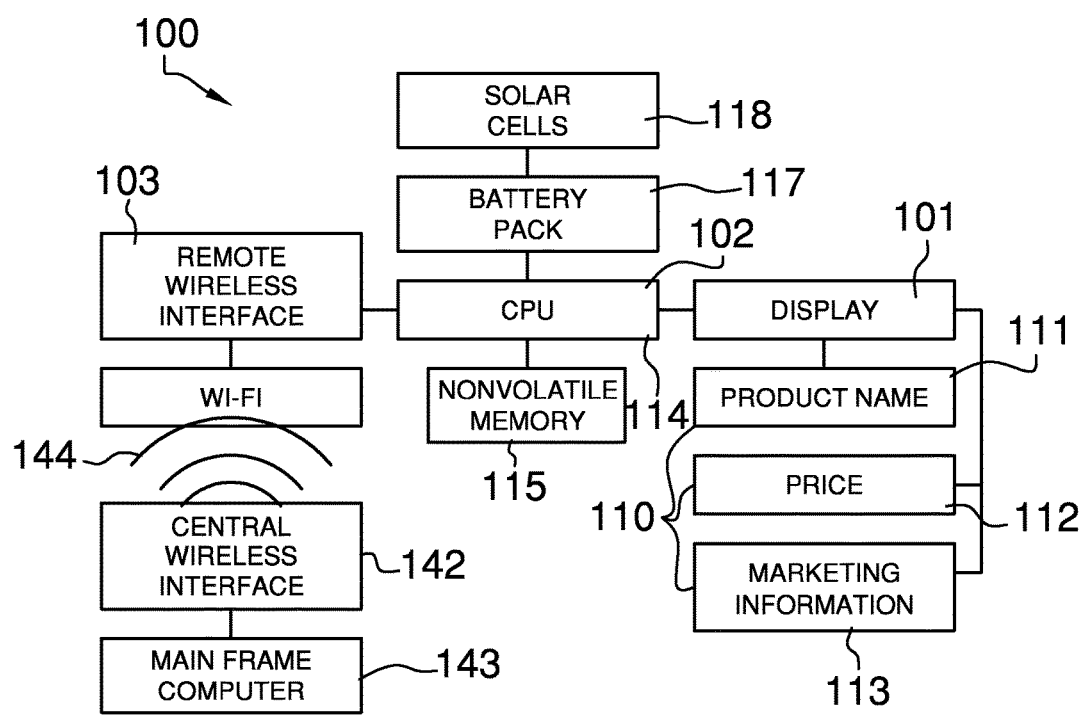
FIG. 5 is a schematic view of an embodiment of the disclosure.

Detailed reference will now be made to a first potential embodiment of the disclosure, which is illustrated in FIGS. 1 through 5. The wireless electronic retail price tag system 100 (hereinafter invention) comprises an LCD 101, a microcontroller 102, a remote wireless interface 103, and a housing 104. The invention 100 is able to communicate with a master computer 143 through a central wireless interface 142. The master computer 143 is used to control the display of the invention 100.

The LCD 101 is a liquid crystal display. The LCD 101 is used to display information 110 about products 188 that are at or adjacent to the location of the invention 100. The display information 110 can include, but is not limited to, product name 111, product price 112, and other product marketing information 113. Other product marketing information 113 may include product origin information, temporary price discounts, or unit price information. The LCD 101 is also capable of displaying information on multiple products in areas where products are tightly packed or displayed.

The microcontroller 102 further comprises a logic module 114, memory 115, and programmable input/output capabilities. At least some of the memory 115 is nonvolatile. This nonvolatile memory 115 allows the invention 100 to operate after recovering from power failures. The microcontroller 102 is used to control the LCD 101, and to manage a wireless communication 144 between the remote wireless interface 103 and the central wireless interface 142. Specifically, the microcontroller 102 receives display information 110 from the master computer 143 and displays the display information 110 on the LCD 101. The microcontroller 102 can also respond to queries from the master computer 143 such as a request to send the currently display information 110 back to the master computer 143.

The communication between the microcontroller 102 and the master computer 143 is handled by the remote wireless interface 103 for the microcontroller 102 and the central wireless interface 142 for the master computer 143.

The remote wireless interface 103 communicates with the central wireless interface 142 to receive new updated display information 110 to be displayed by the LCD 101. The central wireless interface 142 receives the new display information 110 from the master computer 143 and transmits the new display information 110 to the remote wireless interface 103. The display information 110 is passed along to the microcontroller 102, which processes the new display information 110 and displays the new display information 110 on the LCD 101.

The remote wireless interface 103 and the central wireless interface 142 can be connected using an 802.11 or 802.15 (Bluetooth) standard.

The housing 104 is an enclosure 119 in the shape of a rectangular block that houses the microcontroller 102 and the remote wireless interface 103. The LCD 101 is mounted on or in the enclosure 119 of the housing 104 so that the display screen of the LCD 101 screen is visible. The housing 104 further comprises a battery 117, a plurality of solar cells 118, and a plurality of shelf clips 120. The battery 117 is a rechargeable battery that provides electrical power for the LCD 101, microcontroller 102, and remote wireless interface 103. The battery 117 is mounted within the enclosure 119 and is accessed through a battery door 121. The plurality of solar cells 118 is a bank of solar cells that provides electrical power for operating the invention 100 and for recharging the battery 117. The plurality of shelf clips 120 are mounted on the side of the housing 104 distal from the LCD 101. The plurality of shelf clips 120 project away from the housing 104. The purpose of the plurality of shelf clips 120 is to attach the invention 100 to a retail shelf 141.

To use the invention 100, the invention 100 is clipped to a retail store shelf 141. The master computer 143 then sends the desired display information 110 from the central wireless interface 142 to the remote wireless interface 103 using wireless communication 144. The desired display information 110 is received by the remote wireless interface 103, which passes the desired display information 110 to the microcontroller 102. The microcontroller 102 takes the desired display information 110 and displays it on the LCD 101. To change the display information 110, the master computer 143 sends the changed display information 110 to the invention 100.

The LCD 101, microcontroller 102, remote wireless interface 103, and housing 104 are readily and commercially available. The first potential embodiment of the invention 100 uses an Arduino micro controller with an LCD and a WiFi shield. Suitable batteries and solar cells are readily and commercially available. The plurality of shelf clips 120 can be attached to the housing 104 using hardware. Alternatively, a custom housing 104 can be made of molded plastic. Suitable plastics include, but are not limited to, polyethylene or polycarbonate.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A store shelf tagging system comprising:
   a liquid crystal display (hereinafter LCD), a microcontroller, and a housing;
   wherein the tagging system is adapted for use with retail shelves;
   wherein the tagging system displays product information about a product adjacent thereto;
   wherein the displayed product information can be changed remotely;
   wherein the tagging systems further comprises a remote wireless interface;
   wherein the displayed product information can be transmitted wirelessly to the microcontroller;
   wherein the microcontroller further comprises a logic module, memory, and programmable input/output capabilities;
   wherein a portion of the memory is nonvolatile;
   wherein the microcontroller controls the display of the LCD;
   wherein the microcontroller receives display information from a master computer;
   wherein the microcontroller sends the currently displayed information to the master computer;
   wherein communication between the microcontroller and the master computer is handled by the remote wireless interface;
   wherein the housing is an enclosure that contains the microcontroller and the remote wireless interface;
   wherein the LCD is mounted on the enclosure so that the display screen of the display on the LCD is visible;
   wherein the housing further comprises a battery, a plurality of solar cells, and a plurality of shelf clips;
   wherein the battery provides electrical power for the LCD, microcontroller, and remote wireless interface;
   wherein the battery is mounted within the enclosure;
   wherein the plurality of solar cells is a bank of solar cells that provides electrical power for operating the tagging system and for recharging the battery;
   wherein the plurality of solar cells are mounted on the exterior of the enclosure;
   wherein the plurality of shelf clips adaptively attach the tagging system to a retail shelf;
   wherein the plurality of shelf clips are mounted on the side of the housing distal from the LCD;
   wherein the plurality of shelf clips project away from the housing.

* * * * *